United States Patent [19]
Tantry et al.

[11] Patent Number: 5,548,756
[45] Date of Patent: *Aug. 20, 1996

[54] OBJECT-ORIENTED ARCHITECTURE FOR FACTORY FLOOR MANAGEMENT

[75] Inventors: Subhash B. Tantry; Rajesh U. Mashruwala, both of Palo Alto; Barry A. Lozier, Sunnyvale; Richard L. Hess, Palo Alto, all of Calif.

[73] Assignee: Consilium, Inc., Mountain View, Calif.

[ * ] Notice: The term of this patent shall not extend beyond the expiration date of Pat. No. 5,398,336.

[21] Appl. No.: 401,633

[22] Filed: Mar. 9, 1995

Related U.S. Application Data

[63] Continuation of Ser. No. 93,307, Jul. 16, 1993, Pat. No. 5,398,336, which is a continuation of Ser. No. 598,078, Oct. 16, 1990, abandoned.

[51] Int. Cl.⁶ .................................................. G06F 17/30
[52] U.S. Cl. .............. 395/600; 395/200.01; 364/DIG. 2; 364/974; 364/974.7; 364/974.4; 364/917.5; 364/918.4
[58] Field of Search ............................................. 395/600

[56] References Cited

U.S. PATENT DOCUMENTS

| | | | |
|---|---|---|---|
| 4,751,635 | 6/1988 | Kret ........................................ | 364/200 |
| 4,811,207 | 3/1989 | Hikita et al. ............................ | 364/200 |
| 4,831,582 | 5/1989 | Miller et al. ............................ | 364/900 |
| 4,901,223 | 3/1990 | Rhyne ..................................... | 364/200 |
| 5,179,660 | 1/1993 | Devany et al. ........................ | 395/200 |

OTHER PUBLICATIONS

"Database for Production Management", May 1989, D. Weber & C. Moodie, pp. 141–165.

"Towards Fully–Computerized Database Maintenance for Non–Traditional Applications", Oct. 1987, C. T. Wu, pp. 469–474.

"Iris: An Object–Oriented Database Management System," Fishman et al. *ACM Transactions on Office Information Systems*, vol. 5, No. 1, pp. 48–69 (Jan. 1987).

Grady Booch, "Object–Oriented Design with Applications," Chapters 1–7 (1991).

"Object–Oriented Software Construction," by Bertrand Meyer (1988), table of contents.

*Primary Examiner*—Kevin A. Kriess
*Assistant Examiner*—Kakali Chaki
*Attorney, Agent, or Firm*—Blakely, Sokoloff, Taylor & Zafman

[57] ABSTRACT

An object-oriented architecture for a factory floor management software system is described in which factory floor entities are modelled as factory objects within a relational database. The architecture includes X-terminal or bar code devices for facilitating user interaction with the system via one or more of the factory floor entities; Application Engines for processing user interaction of events and generating application service requests; and Application servers for processing the application service requests and generating database service requests in response. These database service requests are utilized to retrieve, manipulate and update data stored within the relational database. Communication Managers are employed for coordinating interprocess communication between the Application Engines, the Application Servers, and the Database Servers. Each of these major components are distributed among computer resources that are networked across the factory floor.

6 Claims, 7 Drawing Sheets

5,548,756

OBJECT-ORIENTED ARCHITECTURE FOR FACTORY FLOOR MANAGEMENT

This is a continuation of application Ser. No. 08/093.307, filed Jul. 16, 1993, now U.S. Pat. No. 5,398,336, which is a continuation of application Ser. No. 07/598,078, filed Oct. 16, 1990, now abandoned.

FIELD OF THE INVENTION

The present invention relates to the field of software system architecture; in particular, to object-oriented architectures constructed for the development of complex software systems.

BACKGROUND OF THE INVENTION

As the software industry matures and the available computational power increases, software developers are being challenged with problems of inescapable complexity. This means that the problems which researchers are attempting to confront in software are of such complexity that it is difficult-if not impossible-for an individual developer to comprehend all of the subtleties of a particular design. In some cases, the complexity of such systems exceeds the human intellectual capacity.

Consider the requirements of a software system which must manage the development and manufacturing process of a multi-engine commercial aircraft; or the fabrication of a very large scale integrated (VLSI) microprocessor circuit. These problems are typical of those encountered in the management of work in a factory shop floor. As is appreciated by practitioners in the art, the management of a factory floor environment is one of the more imposing tasks facing computer scientists today. The enormity of the requirements of a factory floor software system has prompted researchers to search for alternative architectures aimed at handling and controlling the vast complexity of the tasks involved.

In the past, factory floor software systems have comprised traditionally centralized systems. The basic assumption of these prior art approaches is that all of the functional programs run on one centralized mainframe computer system. According to these architectures, the factory floor machine functions were embodied in executable subroutines. However, the main problem inherent with such architectures is that they ignore a basic fact about the factory floor environment; that is, that the factory floor is distributed in nature. Distributed in the sense that machines, resources, labor, work instructions, etc., are all physically located in different areas of the shop floor. Moreover, the task of manufacturing a product requires complex coordination of all of the objects listed above. Thus, the nature of the problem flies in the face of conventional architectural solutions. Because of the distributed nature of the factory floor environment, execution of software functions inherently created conflicts in the control of the factory floor environment in prior art systems.

As will be seen, the present invention provides an object-oriented process architecture for factor floor management software which is capable of tracking, monitoring and controlling all aspects of the factory environment in not simply the work in progress. Importantly, the architecture of the present invention is compatible with the distributed nature of the factory floor since it is itself distributed in make-up. As a result, the present invention produces a substantial savings in terms of performance and in the development of a factory floor software system. Furthermore, because the present invention is implemented in an object-oriented manner, the architecture provides the ability to model real world events and objects directly in software. Other advantages and methods of the present invention will become apparent upon a reading of the detailed discussion which follows.

SUMMARY OF THE INVENTION

An object-oriented architecture for a factory floor management software system is described. According to the present invention, factory floor entities are modelled as factory objects within a relational database. This database includes a library which contains objects that model all factory elements.

In one embodiment, the present invention comprises an interface server means for facilitating user interaction with the software system via one or more of the factor/floor entities. These entities include operators, supervisors, or other users. Most often, the interface server means comprises an X-terminal device or a work station computer running on an X-server. In other instances, the interface server means may also include a bar code device coupled to another work station computer which runs a bar code device server.

The present invention further comprises Application Engine means for processing user interaction of events and generating application service requests as a result. Application service means are also included for processing the application service requests and generating a database service request in response. These database service requests are utilized to retrieve, manipulate and update data stored within the relational database. A database service means provides indirect access to the relational database in response to an application service request. Each of these means bring together information gathered from the factory floor in the form of user input.

Finally, a Communication Manager means is employed for coordinating interprocess communication between the Application Engine means, the Application Server means, and the Database Server means.

Importantly, the architecture of the present invention allows for each of the major components described above to be distributed among computer resources that are networked across the factory floor and even among multiple factory sites.

BRIEF DESCRIPTION OF THE DRAWINGS

The present invention will be understood more fully from the detailed description given below and from the accompanying drawings of the preferred embodiments of the invention, which, however should not be taken to limit the invention to these specific embodiment but are for explanation and understanding only.

DESCRIPTION OF THE PREFERRED EMBODIMENT(S)

An object-oriented architecture finding application in a factory floor management software system is described. In the following description, numerous specific details are set forth, such as specific object-types, tasks, routines, etc., in order to provide a thorough understanding of the preferred embodiment of the present invention. It will be obvious, however, to one skilled in the art that the present invention may be practiced without these specific details. In other instances, well-known elements have not been shown in detail in order to avoid unnecessarily obscuring the present invention.

In the course of describing the present invention, frequent reference will be made to use of the invented architecture in conjunction with a factory floor management software system. It is appreciated that this implementation merely reflects the currently preferred embodiment of the present invention, and should not be taken as a limitation on the scope of the invented architecture. It should also be understood that the concepts embodied in the present invention are applicable, or may be extended, to encompass other implementations, software systems, applications, etc. That is, the novel architecture described below is fundamental in nature, having considerable application beyond the realm of the factory floor environment.

A Brief Overview Of Object-Orientation

A basic assumption underlying prior architectural approaches is that all of the software code runs on a single mainframe computer. This means that instructions are executed in a serial manner on one central processing machine, usually a very large centralized computer. These systems typically assume a functional approach to the way that programs are implemented. That is, the functional aspects of the program are identified along with how the program can access the central database to obtain the data it needs to perform that particular function. The architectural diagram of FIG. 1 illustrates this prior art approach.

Suppose the user wants to represent a machine as an entity possessing certain attributes. For instance, the machine may have an attribute called "NAME" which represents the machine's identification. Other desirable attributes might include "STATE", i.e., the state of the machine - whether the machine is currently idle, in repair, busy, etc. All of the attributes of the machine represent data. This data is shown being resident within block 10 of FIG. 1.

Figure 1:
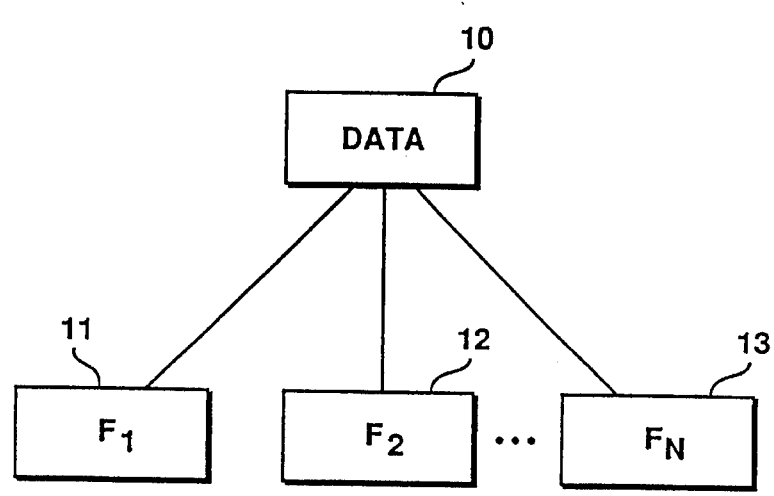
FIG. 1 depicts a block diagram of a conventional approach to software organization.

Also associated with the machine is a set of functions, each denoted in FIG. 1 by blocks 11–13. For example, function $F_1$, represented by block 11, might correspond to the function "START THE MACHINE". In other words, the execution of function $F_1$ transfers the state of the machine from idle to busy. Likewise, function $F_2$ might be defined as the function "STOP THE MACHINE"; and function $F_N$ might correspond to the function "BRING THE MACHINE DOWN FOR REPAIR".

Essentially, what each of the functions represented by blocks 11–13 does is that, given a particular machine identity (i.e., NAME), the function operates on the state of the machine (i.e., STATE). Thus, according to the conventional software approaches, each of the functions $F_1$–$F_N$ is embodied in a separate subroutine.

The main drawback of this approach, however, is that there exists a potential for any number of these subroutines to be in conflict with one another at any point in time. Moreover, running such a program on a central computer ignores the fact that in reality many systems are distributed in nature and therefore require an architecture capable of assimilating that distributed characteristic.

Object-oriented software design is the construction of software systems as structured collections of abstract data type implementations. Importantly, object-oriented software construction allows an entity to be modeled as an object having certain characteristics and certain behaviors. In accordance with the present invention, machines utilized in a factory floor environment are modeled by an associated set of characteristics and functions which it may perform. In this sense, the machine's characteristics (corresponding to the data aspects of software) and behavior (corresponding to the functional aspects of software) are totally encapsulated about a single concept called "object". One of the benefits of object-orientation is that by encapsulating characteristics and behavior into a concept called "object", a high level of correspondence between the software model and reality is preserved. Object-orientation is also ideally suited to a distributed system architecture which relies upon a number of separate computers (e.g., nodes) all of which are connected through a common network; and all of which run programs concurrently (depending, of course, upon the specific functions requested by the user).

Figure 2:
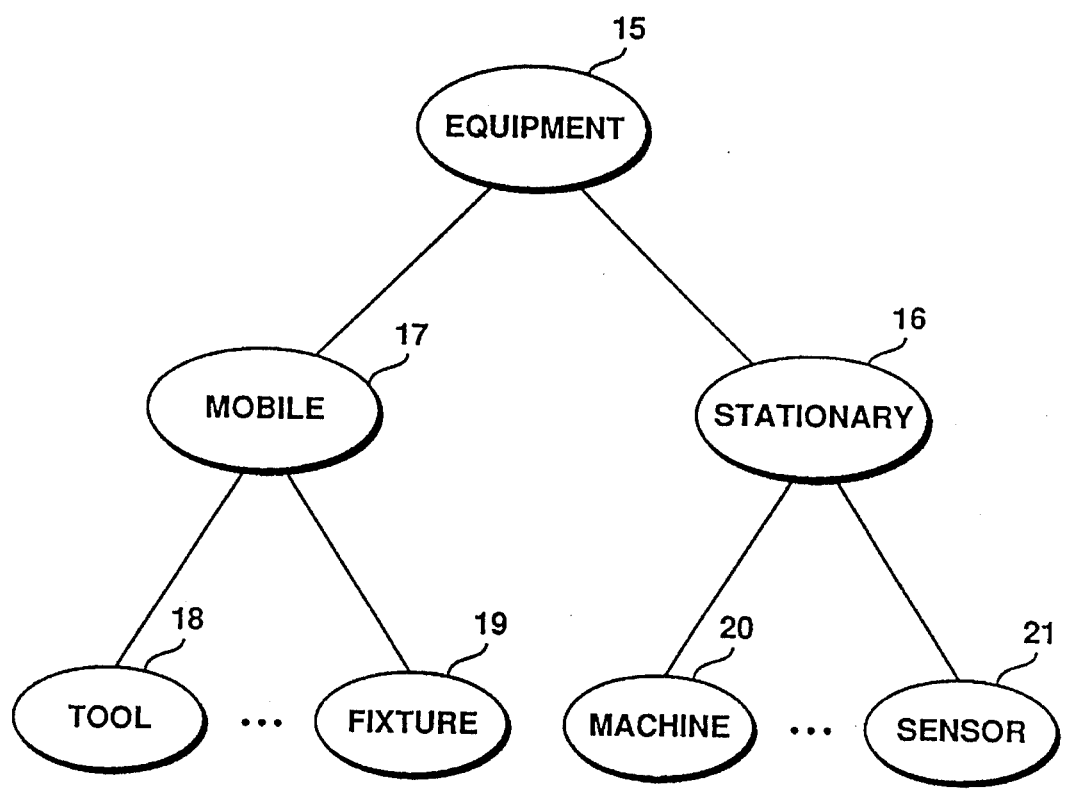
FIG. 2 is a diagram of an example of a hierarchy of selected objects commonly found in a factory floor shop floor environment.

A second important concept in object-orientation is the concept of inheritance. This is demonstrated by the example of FIG. 2. In FIG. 2, an object called "EQUIPMENT" is represented by ellipse 15. This object possesses certain characteristics such as weight, dimension, etc. Subclassed from the parent object "EQUIPMENT" are objects 16 and 17 labelled "STATIONARY" and "MOBILE", respectively. Basically, the hierarchy of FIG. 2 abstracts the common characteristics from the moving and stationary classes into the higher, more generalized, class of object class called "EQUIPMENT".

Note that the "MOBILE" subclass inherits the characteristics and behavior of the superclass object, but each subclass object includes additional characteristics which differentiate them from one another. In essence, the hierarchy of FIG. 2 represents a sort of taxonomy of progressively higher levels of differentiation from top to bottom, and progressively higher levels of abstraction from bottom to top. For example, subclassed from the object "MOBILE" are such objects as tools, fixtures, etc. Similarly a subclass of "STATIONARY" equipment includes machine, sensor, or other similar objects. Thus, it can be seen how the object-oriented nature of the present invention helps to reuse some objects which were previously defined as a superset. From a software development standpoint, this approach produces substantial savings in performance and development time.

Observe that the object-oriented scheme represented by the example of FIG. 2 is vastly different from the functional approach typical of the prior art. In a purely functional approach, each entity is broken into its data in a set of corresponding functions or subroutines, ignoring the common characteristics which could be reused in an efficient manner. One of the other key attributes of the object-oriented approach of the present invention, as applied to factory floor management software systems, is the ability to dynamically link certain behavior. This means that is, because common characteristics are subsumed by increasing levels of abstraction in the object level hierarchy, behaviors that can be commonly applied to various objects within that grouping can be dynamically linked. For example, the user could define a behavior called "PRINT" on a parent object. The parent object itself could be subclassed into different types of printers, e.g., laser printer, line printer, etc. When a command "PRINT" is issued to each device, the software has the ability to realize that the print command is different for each of the different printer objects, thereby invoking the appropriate methods and routines specific to each.

This example points out one of the primary advantages of objects; that is, their reusability. Combinations of objects and messages to the objects, allow more general functionality to be constructed. Thus, the object-oriented nature of the present invention encapsulates functionality at the object library and Application Engine and Server levels, as will be described in more detail shortly.

For a fuller discussion of object-oriented software construction, see "Object-Oriented Design With Applications" by Grady Booch, Chapters 1–7, 1991, which is herein incorporated by reference. Other references which discuss the object-oriented paradigm include: "The C++ Programming Language" by Bjarne Stroustrup, 1986; and "Object-Oriented Software Construction" by Bertrand Meyer, 1988.

The Factory Floor Environment

The present invention is currently embodied in factory floor management software for discrete and batch manufacturing work. However, before preceding with a more detailed discussion of this preferred embodiment, it is helpful to briefly describe the organization of a typical factory floor environment.

The vast majority of factories can be modeled using a small number of basic concepts. The software that models these concepts must be capable of tracking, monitoring and controlling all of the various activities of the factory floor. The present invention, through its use of an object-oriented software architecture, implements these concepts as factory objects. From a standpoint of functionality, the system software is defined by the behavior of these objects.

In the currently preferred embodiment, the reference model for the factory floor consists of four different layers: the work place, which includes work centers, work cells and work stations; inventory, which encompasses both storage and work-in-progress inventory; physical resources, including machines, labor and operators; and logical resources, which embodies work instructions, test plans, and part programs. Each of these four layers are linked with the assistance of bills-of-resources'(BOR) and bills-of-material (BOM), which specify the non-consumable resources and materials needed to perform a given operation. The layers are also linked with the aid of routing which specifies the sequence of operations a manufactured item must go through during the production process.

Figure 3:
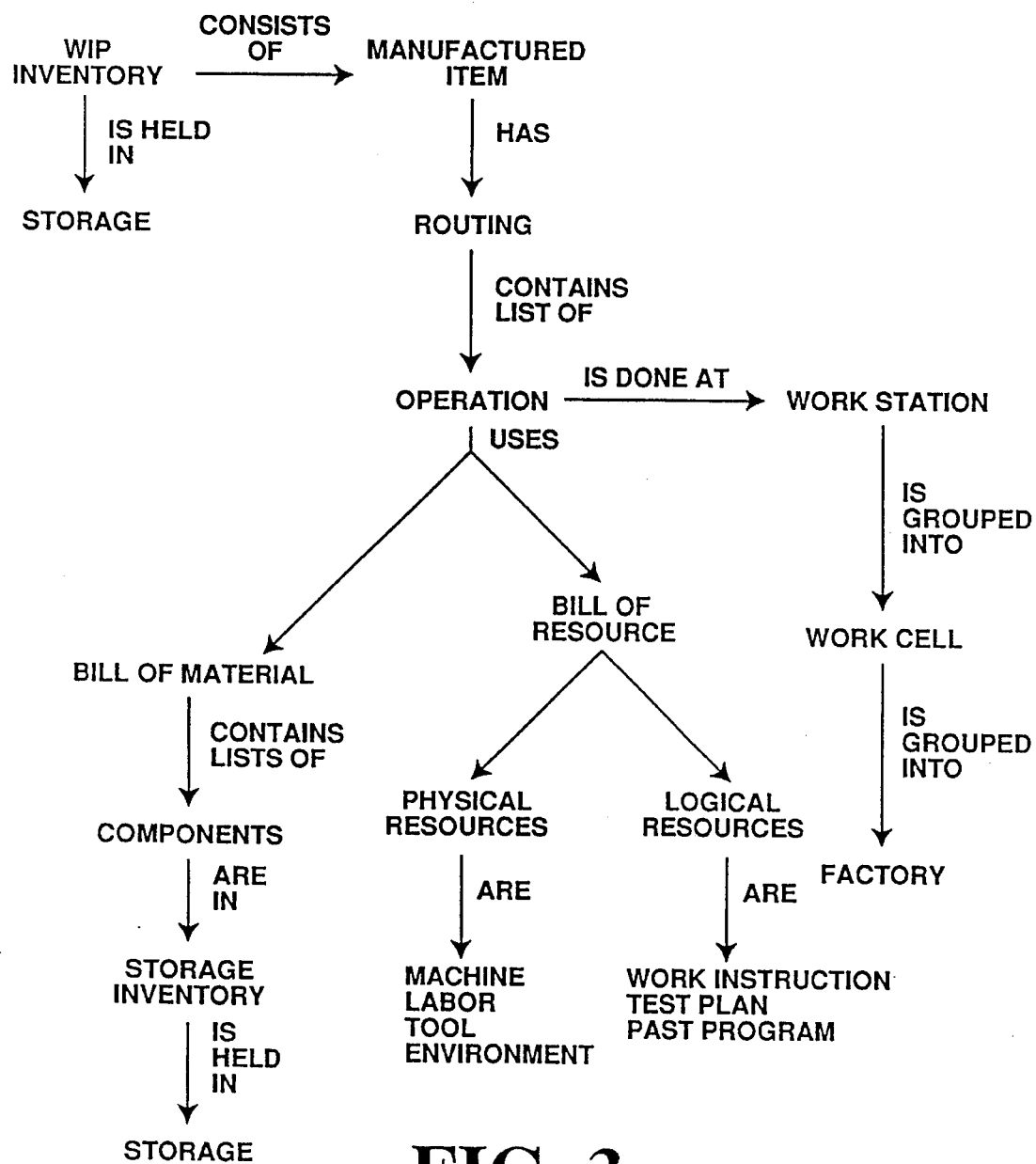
FIG. 3 illustrates the relationship between various factory objects in accordance with the currently preferred embodiment of the present invention.

The complete relationship of these four layers is shown in FIG. 3. Observe that work-in-progress (WIP) inventory consists of a manufactured item that has routing and contains a number of operations. Each of the operations uses one or more BOMs and/or BORs. The resources and materials are combined at work stations which are grouped into work cells. Each of the work cells may be further abstracted to work centers, which finally are grouped to comprise the factory itself.

The software system used in conjunction with the present invention operates as the centerpiece of factory floor management. That is, software programs manage the three operational centers- the work center, work cell and work stations. Altogether, the system interfaces all of the automated pieces of equipment, cell controllers, and shop floor data collection devices to provide seamless integration of all devices operating within the factory.

A work station is a stationary location where work is performed. An assembly work bench, a milling station, and inspection station are examples of work stations. Work generally implies the processing of material, such as assembly, fabrication, test or packaging processes. Preferably, the concept of work is broadened to denote any kind of work, including machine repair, set-up and operator training. To perform work at a work station, resources such as machines and labor are allocated to the work station. Once the work is completed, the resources are deallocated and the work order is moved to another work station.

A work cell is defined as a conveniently organized group of work stations. The work cell is formed based on many factors, such as process flow and shared storage. A synchronized or paced line, a test area, or a small assembly line are each modeled as a work cell in conjunction with the currently preferred embodiment of the present invention.

A work center is a conveniently organized group of work cells. A work center is generally formed based on the assumption that one particular item is going to be manufactured in one work center. In a work order environment, the work order is released and closed within one work center. When an item requires more than one work center, the routing of the item goes from one work center to another in a sequential manner.

Figure 4:
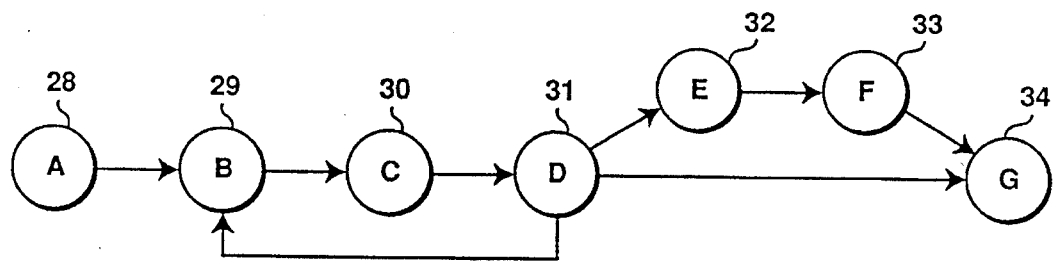
FIG. 4 illustrates a simple routing example for the manufacture of a product as a sequence of work-related operations.

FIG. 4 illustrates an example of a routing path that may be employed in the manufacture of a certain item. Each node (e.g., 28–34) in FIG. 4 represents a distinct processing point, also referred to as an operation. Once an operation has been completed, a decision is made on the disposition of the material. The disposition determines the next operation to which the material will be transferred. If an operation has been successful, the material will pass to the next operation in the routing sequence. By way of example, the progression from operations A-B-C-D represents a normal flow for an object manufactured according to FIG. 4.

If the disposition was to fail, for instance, at node 31, then rework may be required. This is represented in the routing diagram by the rework path from node 31 back to node 29 (i.e., from D to B). A choice of alternate paths, such as manual versus automatic assembly, is illustrated in FIG. 4 by two separate paths: one directly from node 31 to node 34, and the other from node 31 to node 34 via nodes 32 and 33.

Realize that the whole concept of shop floor control utilizing the architecture of the present invention allows a user to keep track of the entire manufacturing process. In other words, during the manufacture of say 10,000 widgets, a record is maintained of what machine worked on the widgets, at what point, what was the state of the environment during that work, what were the work instructions followed, etc. The entire history of events is recorded so that one may retrieve information pertinent to any operation performed anytime during the manufacturing process.

This information is important for several reasons. Consider the situation wherein a part fails during normal usage. It may be critical to understand how and why that part failed and a manufacturing history becomes invaluable. In other cases, the manufacturing process itself is unstable and software control of the shop floor environment permits analysis of the manufacturing process for the purpose of improving consistency and efficiency. An example of this latter situation often occurs in the fabrication of semiconductor integrated circuits wherein yields must be improved through vigorous analysis of a multitude of processing parameters.

Architectural Overview

The object-oriented process architecture of the currently preferred embodiment is based on the factory floor application-dependent assumptions discussed above. These assumptions are categorized as actions or requirements of the factory floor, work centers, work stations, work cells, tasks, and users.

Figure 5:
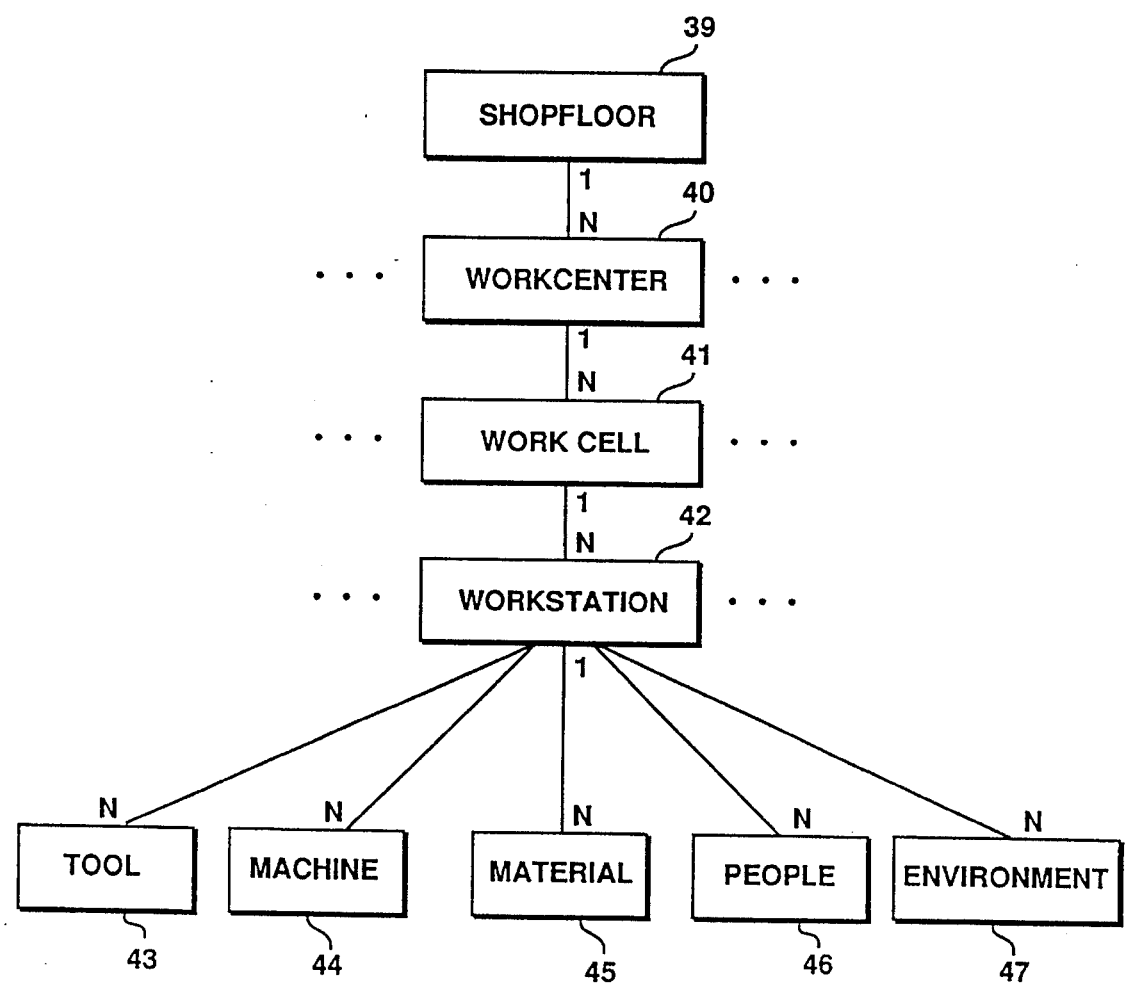
FIG. 5 shows the hierarchy of factory floor objects in accordance with the currently preferred embodiment of the present invention.

Referring now to FIG. 5, a hierarchy of factory floor objects is shown. By way of example, shop floor block 39 embodies the factory floor itself. Located within shop floor 39 there are any number of work centers 40. Each work center consists of a specialized, well-defined and focussed manufacturing function performed in synchronization with other work centers to meet the manufacturing goals of the factory. Work centers all have the trait that they must communicate with each other and be capable of accessing each others' database.

Each of the manufacturing functions within a work center are hierarchically decomposed into tasks. The beginning of a task, the completion of a task, and (if the task is decomposable) the start and completion of the sub-tasks in between, are represented as events.

Every work center 40 consists of a plurality of work cells 41. Work cells 41 are made up of a group of tasks that are performed in a synchronized and controlled manner. The individual tasks may be performed asynchronously, but are typically within the control of a work cell controller in an automated environment, or a group leader/operator in the case of a manual environment. Work cells, are further broken down into work stations 42 wherein individual tasks are physically performed within the control of a work cell controller.

Note that in FIG. 5, the capital letter "N" indicates that there could be one or more items at that particular level. For instance, a factory floor is usually supported by ten or more work centers. (The dots to the sides of each of the blocks 40 through 42 represent these "N" items which could exist at a parallel level in the hierarchy.)

The work station is the physical representation of an interactive environment that performs a manufacturing task. Typically, the interaction is limited to factors of production: including materials, operator/supervisor, tools, work station environment and manufacturing task definitions and work instructions. Tasks are performed by, on, or using any of these factors. For example, the task of building a product at a manufacturing operation may require the use of specific piece parts, an operator with a particular skill level, and machines with particular set-ups involving various tools. Some manufacturing operations may be sensitive to the work station environment where the operation is performed. Factors of productions get allocated to work stations to perform a task as defined in the bill-of-resources for the task.

The task definition includes the factors of production required to perform the task and its decomposition into subtasks. The tasks to be done at a work center need to be planned, scheduled, controlled and tracked. Planning can be weekly, daily, or by shifts. Scheduling may have to be done from one job to the next in real-time.

It is appreciated that the software system employed in conjunction with the present invention monitors and controls each of the work stations involved in the manufacturing process. In this way the architecture of the present invention provides the end user with an integrated view of the factory floor, which itself can be defined as or modeled as close to reality as possible. The integration is not limited to the factors of production, but crosses factory work center boundaries and allows for easy integration to other software systems.

The architectural premise of the present invention is based on user requirements. These requirements include ease of use, the ability for the user to configure the system, object orientation, the ability to distribute components and the ability to port the software to various hardware platforms. In this way, the architecture of the present invention ensures that the end user interface to the software system is simple, elegant, and rich in application-dependent functionality relevant to the factory floor.

Hardware/Software Architecture

According to the present invention, the complex environment of the factory floor is partitioned into smaller pieces which are considered as factory objects. One of the architectural goals of the present invention is to identify a familiar set of factory objects and build software functionality, data representation, and the user interface around the creation, manipulation, control, data collection, analysis and management of these objects. Factory objects can be any of the five factors of production previously discussed, represented as work orders, lots, serial IDs, components, machine/tools/operator types, etc. Factory objects can also be such things as concepts, part definitions, BOM, specifications, routing, or even data display objects, such as quality control charts, etc.

Importantly, the architecture of the present invention allows for each of its major components to be distributed among computer resources that are networked across the factory floor and among multiple factory sites. The primary motive for this approach is that the process of manufacturing a product—as encapsulated within all the work centers on a factory floor—demands a distributed environment. Since the architecture of the present invention allows each major architectural component to be processed on any appropriate computer resource that is available on a network, the architecture is characterized as having a distributed processing capability. By the same token, the architecture of the present invention provides for a distributed database capability enabling the user to collect and access data anywhere on the network. Moreover, this distribution is largely transparent to the user.

Form, function, data and communication are four important aspects of any software system. Form defines the "look and feel" of user interaction and helps determine how data is represented and passed to an output mechanism. The output mechanism usually comprises a bit-mapped work station, a character cell terminal, or some form of data buffer resident in memory or on disk.

The functional aspect of software refers to capabilities that are application dependent. For instance, most of the shop floor control application code employed in conjunction with the present invention is concerned with the creation, manipulation, control, data collection, analysis and management of factory objects. In other cases, the functional aspect of software represents the actual application running against the user interface.

Within the context of the present specification, data means the representation and physical storage of data that is collected and used during the creation, manipulation, analysis and management of factory objects. In other words, data represents the ability to make persistent entries into the software system.

Finally, the communication aspect of software establishes a dialog between each of the form, function, and data aspects of the software. Communication is embodied in the present invention through a message passing architecture which allows messages to be sent across the network from one program or application, to another program or application running on a remote machine or node. In accordance with the currently preferred embodiment, the communication component has the primary task of delivering messages generated by one of the architectural components to another receiving component.

Figure 6:
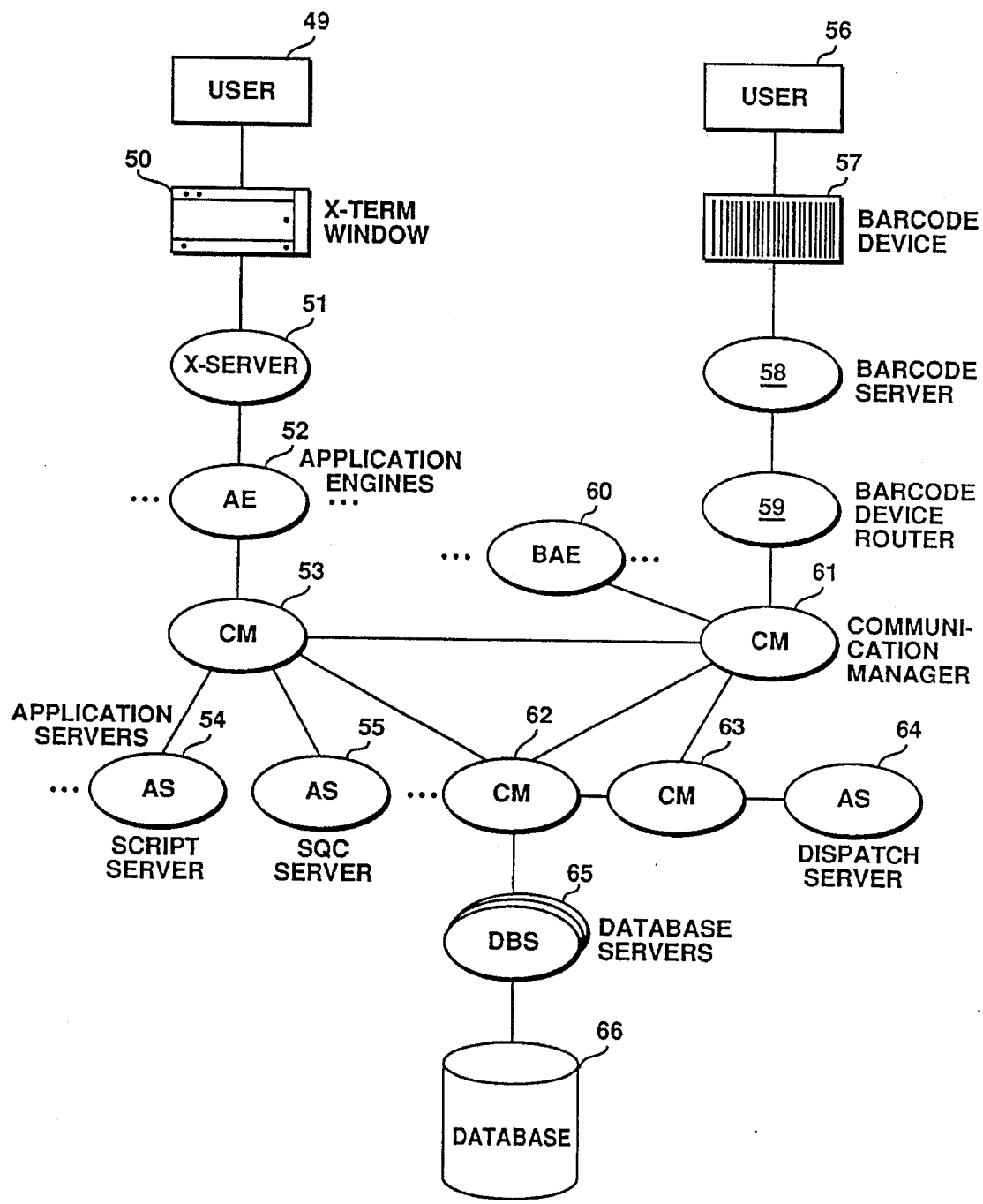
FIG. 6 illustrates the distributed nature of the architecture of the currently preferred embodiment of the present invention.

A key feature of the present invention is the fact that each of the four aspects of software described above are embodied in the architectural diagram of FIG. 6, which illustrates the distributed architecture of the currently preferred embodiment. As can be seen, a user, represented by block 41, interacts with factory floor management software system via a windowed interface in front of an X-terminal 50. The user may be entering data, retrieving or manipulating data, or simply monitoring the manufacturing process. A second user 56 is also shown interacting with a different terminal—however, in this case the data entry device is a bar code reader device 57.

During a normal operating session, user 41 interacts with the display window which is effectively backed-up by its own X-server program 51. Program 51 runs on the front-end machine displaying window 50, which preferably comprises one node in the network. The same is true of bar code device 57. That is, there exists a bar code server 58 which runs on a front-end computer or node. Both of the machines associated with servers 51 and 58 run software programs that execute a code to accept inputs from either bar codes device 57 or from X-terminal window 50. These inputs are passed across the network to various applications which embody the function of the factory floor management software system. In this way, the interface services implement the form aspect of software. One of the primary functions of the interface services is to provide a means of initiating service requests to the application services which, in turn, can request services from the database services. It is appreciated that in the embodiment of FIG. 6, all of the objects (including the Database Servers) may be distributed across networked computer resources.

Within X-terminal window 50 there are various input means such as buttons, a keyboard, typed commands, graphics, icons, etc., each of which is preferably modeled as an object. By way of example, when the "RETURN" button is depressed on the keyboard, this activity is treated as an object effectively invoking a method which goes and changes a certain characteristic. For example, the method may consist of first graying out the display screen and then executing an application which runs in a background environment.

It should be understood that each of the elements or objects illustrated in FIG. 6 are distributed as separate processes running on various computer nodes throughout the network. To insure proper system performance, it is necessary to have a dedicated interface service and application service component for each end user. To better understand the interaction of these services, it is helpful to be introduced to the concept of Application Engines (AE) which are part of the user interface.

The Application Engine maintains the context of the transaction in terms of application service requests going to, and completed by, Application Servers (AS) via the local Communication Manager (CM). An Application Engine that requires an entry from an end user (via an X-window) is commonly referred to as an X-Application Engine (XAE).

The application architecture of the present invention supports interactive and non-interactive (computational) applications. A typical application consists of an Application Engine and one or more Application Servers. The primary distinction between an Application Engine and an Application Server is that Application Engines do not interact directly with factory objects. Instead, they leverage Application Servers to create or modify factory objects. Application Engines form the primary interaction with the end user. Application Servers never interact with users directly.

Each Application Engine comprises a separate process which contains, at a minimum, an event handler and some application-specific code. The event handler is a process which responds to event messages (i.e., requests) delivered from the Communication Manager and to X-window event signals delivered by the X-interface. Each Application Engine also contains non-reusable application-specific code that maintains the application context/state and creates application service requests. These requests are passed to the Communication Manager, which routes the request to an appropriate Application Servers.

Basically, Application Engines are the background processes that process the user interaction further. As such, each Application Engine normally resides on a separate node within the network. By way of example, in FIG. 6, Application Engine 52 is dedicated for X-term window 50, whereas bar code Application Engine (BAE) 60 is dedicated for use with bar code device 57.

Interactive Application Engines are called X-based Application Engines (XAEs). (Note, if an Application Engine does not have a user interface it is simply referred to as an Application Engine). An X-Application Engine contains X-user interface (XUI) code which provides the complete user dialog and presentation components of the software system. Currently, this code is based on the XUI tool kit from Digital Equipment Corporation, which runs under the DEC windows environment.

The XUI code within an Application Engine creates the application window(s) and populates it with "widgets" (the term "widgets" refers to user interface abstractions, such as buttons, menus, text fields, graphics, etc.) from the XUI toolkit. The XUI widgets interpret X-events coming in from the users' X-server and make calls to the callback routines within the Application Engine. Callback routines map user interactions from the X-server (X-events) to specific Application Engine functionality. Thus, Application Engines bridge the user interface widget library with the factory services/factory object library (to be discussed further shortly).

The script Application Server shown in FIG. 6 by ellipse 54 is an example of a specialized Application Server. With the script Application Server, the user selects and runs a specific script code. The script Application Server generates X-Application Engine requests and passes the requests to the Communication Manager, such as Communication Manager 53 in FIG. 6. The Communication Manager, in turn, invokes XAEs. Because other X-Application Engines can be spawned, an application programmer can use script to provide sequence control over the execution of a collection of X-Application Engines. In order to invoke an X-Application Engine, the user must provide an identifier (XID) for the display.

The first time an X-Application Engine "invocation" request is received by a Communication Manager, the requested X-Application Engine is spawned and the process ID is entered in an active process table. The requested XID (the identifier for the display)is also stored in the active process table. The X-Application Engine order request is then passed to the newly spawned X-Application Engine process event handler. This event handler opens an X-connection to the requested X-display and creates the appropriate application windows.

Once the transaction has finished, the X-Application Engine process removes the application windows from the X-display and returns to a dormant state. When this state is entered, the X-Application Engine generates an X-Application Engine "inactive" event which gets sent to its local Communication Manager.

In the example of FIG. 6, process 53 acts as the local Communication Manager for processes 52, 54 and 55. When another X-Application Engine invocation request is received for the same type of X-Application Engine process, the dormant "inactive" process is reactivated. The Application Engine displays its application windows and is immediately ready to perform a transaction.

Functionality is achieved using Application Server processes. These programs bring together information (i.e., user input) gathered from the factory floor. This functionality includes machine and equipment tracking, labor tracking, work in inventory tracking, short interval resources scheduling, work and dispatching, user defined alarms and inquiries, statistical process control, and factory floor mail. Each of these broad areas consist of transactions that perform specific tasks. Each of these transactions is built form one or more Application Server processes which provide a well-defined, reusable system level of service. In this context, system level means that the service is transparent to any user of the system; with the user only seeing the notation of the transcription. However, the service is packaged independently, because it is used by many different transactions. In this respect, one can think of Application Servers as sub-transactions which, when nested together form the basis of the Application Engine transaction.

The Application Servers (AS) implement the functional aspects of the software system and are the only services that can access database services. An Application Server performs an application function at the request of the user interface, specifically an Application Engine. Each on-line transaction is under the control of an Application Engine. The requests are routed by the Communication Manager on the node where the Application Server is running. Each request is treated by the Application Server automatically without maintaining any context information between the service request from an Application Engine.

For example, in FIG. 6, Application Servers 54 and 55 may perform application functions at the request of Application Engine 52. These requests are routed through Communication Manager 53, and, in the case of a database service request, pass through Communication Manager 62 to Database Server 65. Note that some of the functional aspects performed by Application Servers are globally required within the software system. This means that you could have many Application Servers running on a single node within the network, just like you could have many Application Engines running on a single node.

Each Application Server is a separate process spawned by the Communication Manager. The function can be used by many independent Application Servers or Application Engines. The Application Engine can also concurrently request services from many Application Servers. The Application Engine event loop is written to accommodate the return, if any, from multiple Application Servers processes. Independent Application Servers allow the Communication Manager to prioritize service requests.

To provide reusability and concurrency, each Application Server is written as a stateless procedure. That is, unlike the Application Engines which maintain the state of the user dialog and the state of the transaction, each Application Server only provides a single service. This service could be a set of values returned, or the successful operation on a set of objects and writing those changes to the database. To achieve these ends, each Application Server has a simple event handler which accepts requests for its services and then packages a return message. After the return, it sits in an idle wait state for the next request. This encapsulation of a multi-object interaction, provides a single element of functionality. This is useful to many different transactions and provides the service level of functional granularity.

There are two specially dedicated Application Server processes on each application node: the remote object server and the script server. The remote object server process is the single process on each node that handles requests for operations on non-persistent shared objects. The remote object server contains a table of non-persistent shared object IDs and their locations. Since there is only a single remote object server process per node, the Communication Manager must queue requests if more than one request arrives at the same time. In all other aspects, the remote object server is just another Application Server process.

The second dedicated Application Server process is the script server—a service that reads and interprets and executes user written scripts. The script interpreter is able to parse script into object messages, requests different Application Engines and performs programming language operations.

In basic terms, each Application Server contains one or more of the following: Application code that performs the transaction-specific integrity checks among factory objects and makes database updates that make changes to the factory objects persistent; factory objects that receive messages from the transaction specific application code to query or update the instance variables of factory objects; or a remote objects service which provides a read-only access to specific non-persistent objects in its local shared memory cache at the request of a remote communications manager.

A remote communications manager typically makes such a read request to the local Communication Manager which then routes the request to its local remote object server. For example, in FIG. 6 there may exist an Application Server 64 to dispatch a lot of material while another Application Server (not shown) starts a machine. The architecture of the present invention allows for a complex Application Engine to make application service requests that can be processed asynchronously. This implies that each Application Server runs in its own process space to allow for a multi-threading capability. In this respect, it is possible for an Application Engine to request that the "START MACHINE" application service be performed in parallel to that of the dispatch or "MOVE-IN LOT" application service.

In the example of FIG. 6, Communication Managers 53, 61, 62 and 63, provide for structured location-independent interprocess communication across nodes. They also incorporate the necessary network management with heterogeneous network support. Hence, each Communication Manager runs as a separate process on each node that requires interprocess communication within or across nodes. The flexibility of the present invention is the separation of responsibilities and encapsulation of functionality. A great deal of this separation is in the form of unique processes. Therefore, a central coordinator (e.g., the Communication Manager) is needed to route service requests and replies between transactions. This central mechanism must also create and manage the various processes. According to the present invention, the Communication Manager is a separate process that coordinates data communication between Application Engine, Application Services, and database services processes. Only one Communication Manager exists on each application node.

Figure 10:
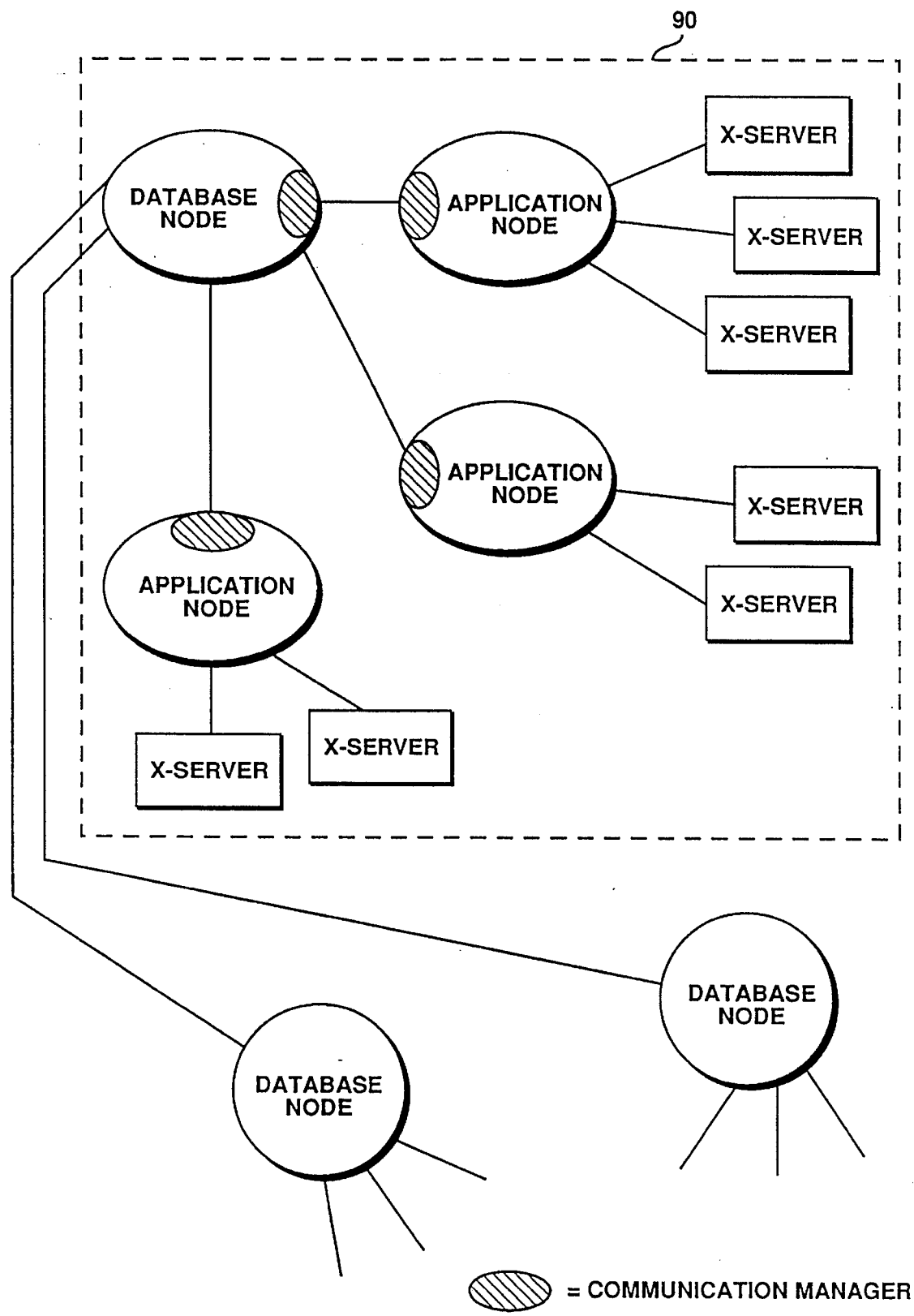
FIG. 10 shows how a group of application nodes are grouped together to form a domain in accordance with the currently preferred embodiment of the present invention.

It is appreciated that the inter-relationship and number of processes available for any transaction is complicated by the distributed architecture of the present invention. As the possible combinations are increased, the problems and complexity of the Communication Manager is also increased. To limit this, the architecture of the currently preferred embodiment is moderately constrained, as depicted by the diagram of FIG. 10, so that each database node serves only a sub-set of application nodes. These application nodes, in turn, support a sub-set of X-server nodes. A group of application nodes is referred to as a database domain which is shown by dashed line 90 in FIG. 10.

Database Servers interface with the database system on its node and communication with other Database Servers from other domains, to retrieve distributed data. Database services do not communication directly with application nodes served by other databases. Likewise, the application nodes which it serves can communicate only with other application nodes within their domain. Only by requesting an object message invocation via the remote object server do application nodes with different database domains communicate.

With reference once again to FIG. 6, the X-Application Engines on a node communicate with Application Servers through the local Communication Manager, as previously discussed. By way of example, Barcode Application Engine 60 communicates with Application Server 64 through Communication Managers 61 and 63. There is also a Communication Manager 62 that runs on the database node that routes messages to the Database Servers 65 from the Application Servers.

Consider now what happens when a normal operating session commences. When the factory floor software system is started, the first task of the Communication Manager is to spawn one display manager process for each X-server physically connected to the node. The Communication Manager maintains a table, created during the software system's configuration, which contains the network topology. The X-servers, other application nodes, and the local database node are listed. This list is both used at start up and during normal operation. After starting the display manager processes, the Communication Manager spawns a set of application services which handle the user log-in. The node is now ready for use.

As each X-server accepts a log-in, a list of valid transactions is returned. As these transactions are selected, Application Engine processes are created by the Communication Manager. As a service is requested, the Communication Manager spawns a new application service of the type requested. These processes are never terminated, but are reused by the Application Engine which requests the type of service it has to offer.

The Communication Manager maintains a table relating process ID with the service type of each Application Server. These services are not limited to use by only Application Engines. Any Application Server can use the services of another Application Server. The Communication Manager makes this service requesting independent of requesting process type. This provides the basis for the different levels of functionality: the Communication Manager and Application Engine processes request services from application services, and provide transaction "start" and "commit" database services messages. The application services level conducts the object messaging and writing to the database. The Communication Manager transparently routes all messages.

Message routing is one of the major functions of the Communication Manager. At log-in it routes the display manager request to a log-in Application Server. Thereafter, it routes Application Engine or Application Server requests to available application services based on the server name. It then routes the replies back to the requesting Application Engine or server.

The Communication Manager transparently maintains this temporary process linking. If no Application Server of the type requested is available, the Communication Manager buffers the request until one is available. The Communication Manager has a prioritization mechanism that allows priority messages to be serviced immediately, regardless of the process limit.

In sum, the Communication Managers embody the communication aspect of software and provide the following: service request queuing and prioritization; message routing; Application Engine, Application Server and Database Server processor management and assignment; transaction ID generation; start work messages to Database Servers within the context of a transaction ID; and broadcast requests for services that it cannot provide to other Communication Managers.

Database Servers implement the data aspects of software and provide database services which run in their own process context. In the architecture of the present invention, there are usually a pool of Database Servers 65 waiting to process messages from the various Application Servers distributed across the network.

A Database Server includes procedures that process messages from an Application Server to access a relational database 66. These procedures are methods embodied in data objects. A Database Server maintains the complete context of a database transaction as defined by a corresponding Application Engine that it is currently serving. Note that according to the preferred embodiment, there is only one type of Database Server, but there could be many instances of the Database Server servicing multiple Application Servers at the same point in time within a database node of a work center.

It should be apparent that because the architecture of the present invention distributes components across networked computing resources, there is a requirement for a database subsystem that can support a networked connection to client applications. Thus, the concept of distribution extends to the data itself. Within the network, multiple dedicated database central processing units (CPUs) store different subsets of data within a framework. This is known as horizontal fragmentation. The database services layer transparently manages the subsets and acts as other database nodes as required to fulfill an application request.

With the database services, the user can add database elements to the standard framework. Application level support, such as scripting language and special objects, incorporates these new data items into the workings of the applications. With Database Services, the user can define these new entities and add them to the framework definition in a controlled and supportable way. The user may also dynamically define derived attributes. These values are derived from calculations, tables, or look-ups, and express relationships between attributes that the user may want to monitor. These values may also be made accessible to the applications through the scripting language.

Because the currently preferred embodiment of the present invention is designed for a work-order and repetitive manufacturing environment, the amount of data maintained and updated in this environment for an individual item is relatively small. The objective is to maximize the run rate of the production line. As a result, there is a high proportion of query transactions in the applications, such as status screens and alarm condition checks. To maintain database integrity, a number of database reads are involved in a given update transaction. For example, a read performed to verify the existence of related data may rely heavily on the speed of query processing. Embedded systems, such as sensors, bar code readers are not dependent on the completion of a database transaction before they clear their buffers to accept the next input. These factors indicate the emphasis in tuning should be on query performance.

Another purpose of the database services is to provide a transparent translation between the relational database model and the object-oriented applications model. For efficiency, certain parallels are necessary. For example, each factory object corresponds as much as possible to a single data relation, to minimize data access involved in instantiating (i.e., building) the object. Some situations require modeling differences, such as translating memory pointers between related objects in the applications realm, into references to primary and foreign key fields and database entities. Thus, one of the software systems' primary objectives is to automate the process of building factory objects from the contents of the database.

In its simplest form, each Database Server can be thought of managing persistent objects permanently stored within the database. Of course, the Database Server also supports distributed access of data. This approach is advantageous since the reality of the factory environment is that there are many factory objects located at different areas across the factory floor. Thus, it becomes necessary to store object data close to where the objects physically reside. This requires the Database Server to provide distributed access to data across different databases, and preferably a distributed update of data.

It is interesting to note that according to the architecture of the present invention, any one of the four aspects of software (e.g., form, function, communication and data) can be running on any given node, or only on one node at any point in time—depending on how the user wants to configure his system. For instance,-one scenario might be to have all of the Application Engines, Application Servers, one Communication Manager and a database reside on one large back-end computer with a plurality of smaller capacity display devices for user interaction. A more common scenario is to distribute everything within the factory floor environment. That is, Database Servers would reside on one machine, Application Servers on others, and front-end Application Engines would be running on still other separate nodes. In this way, the system is never totally dependent on one computer. In other instances, it may be desirable to distribute databases across multiple nodes because of its large size. Obviously, the idea of distributing the four aspects of software in this way revolves about the fact that the factory floor is distributed by nature.

In accordance with the currently preferred embodiment of the present invention, Application Engines normally run on a VAX-3100 computer, which together with its associated server, constitute one node of the network. A VAX-4000 computer is preferably employed as the Database Server with the Application Servers are residing in another VAX-3100 machine.

In implementing the hardware architecture, it is assumed that a factory wide network with high bandwidth and baud rate is available. Of course, there could be other computers that meet corporate information system needs on the same network, or there may be a computer on the same network that acts as a corporate gateway to a corporate wide network. A typical network is DECnet and/or Transport Control Protocol/Internet Protocol (TCP/IP) compatible.

Each work center is normally supported through a network of super minicomputers, super microcomputers, work station computers and industrial PCs. The super minicomputer can act as a corporate gateway. Furthermore, each work center preferably has a super microcomputer that acts as a central database machine and which can also function as a boot node for the work center. All computers that belong to a work center are commonly local area networked.

Preferably, each work station in a work center is supported by a bar code device or work station computer. All bar code devices are usually connected to an industrial PC that acts as a data collection concentrator for the work center. Obviously, a supervisor may need to have a work station computer dedicated to his/her own needs.

Note that the foundational architecture discussed so far could be supported by any number of application software systems. Since the architecture of the present invention incorporates features that are both flexible and extensible it is ideally suited for factory floor management, control and automation. However, it should be understood that other applications could also take advantage of the architecture described thus far.

Figure 7:
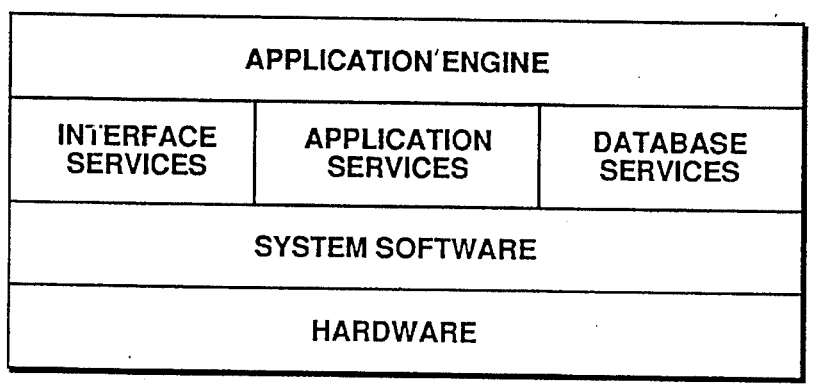
FIG. 7 illustrates the architectural layers maintained by the present invention

Referring now to FIG. 7, the taxonomy of the various architectural layers of the currently preferred embodiment of the present invention are shown. The majority of the on-line and/or real-time application software is embodied in the Application Engines that may or may not require the services of an X-server. Conceivably, an event scheduler or application may not require the services of an X-server. On the other hand, there could be Application Engines that might leverage off of a bar code service. To repeat, Application Engines that require the services of an X-server are known as X-Application Engines. These Application Engines maintain the context to the transaction in terms of application service requests made to and completed by Application Servers via the Communication Manager.

Synopsizing up to this point, the distributed, object-oriented architecture of the present invention follows a message passing paradigm. The architecture is characterized as being distributed over three types of computer nodes—the interface server node, the application node, and the database node. The Application Engines, the Application Servers, the Communication Manager, and other remote servers or managers (e.g., display managers) all run on the application node. The interface server node is typically an X-terminal device, such as a work station computer that runs an X-server. Bar code devices may also be connected to a work station computer that runs a bar code device server. Finally, database nodes contain Database Servers which provide access to a relational database storing a library of factory floor entitles modelled as factory objects.

To better comprehend the present invention consider the following architecture interaction example. Assume that a user wishes to start a session by entering a command on an X-terminal or work station. The start-up message is sent to the Communication Manager on the application node that is associated with the user's X-server. (It is assumed that the X-server is running at an interface server node.) As soon as the Communication Manager receives this message, it establishes a connection with the X-server and presents a log-on window to the user. The log-on window is a special application that requires the user to enter a user name and password to acquire access to the system. The log-on application—like other Application Engines—generates application service requests to the Communication Manager to process the user log-on. With a successful log-on, the user is presented with a menu of appropriate applications which he can now invoke. Each on-line transaction represents a specific application.

Once an application is invoked, the Communication Manager receives a request for a specific application. In response, the Communication Manager spawns an Application Engine then process that embodies the evoked application. The Application Engine then requests an open database service at the database node, displays the application window, and waits for the user response. After that, the Application Engine continues to process subsequent user interaction events from input devices and generate application service requests to the Communication Manager. The Application Engine also issues the open and commit database service requests when required.

Hence, each on-line transaction is within the control of an Application Engine. Additionally, the Application Engine controls when the database is opened and when changes are committed. It may open and commit a database any number of times. Between an open and commit of a database, the Application Engine makes application service requests that are processed by Application Servers.

As the user interacts with the application window, the X-server continues to generate X-events. The X-events are shipped over the network by the X-server to the Application Engine. Each X-event received by an Application Engine is either ignored or processed. Relevant events are processed by evoking C language functions known as callbacks. Each relevant X-event is tied to a callback. If a callback requires the services of an Application Server, the Application Engine sends an application service request to the Communication Manager. The Application Engine may then block itself, and wait for a reply to the request.

Each application service request is processed by an application service process. The Communication Manager determines which of the Application Servers can satisfy the application service requests. If the corresponding Application Server already exists, the Communication Manager routes the application service request to the Application Server. The Communication Manager spawns an Application Server process if the Application Server does not exist. Next, the Application Server processes the application service request and sends the appropriate completion/error message to the Communication Manager which, in turn, routes it back to the Application Engine that made the original request.

Note that the Application Server, while processing an application service request, may instantiate the data segments of factory objects it needs which are stored in a shared memory cache (shared across the network). After the factory object has been instantiated in the shared memory, the Application Server manipulates the data segments of the object by evoking factory object methods. Each Application Server makes database service requests to retrieve data it needs from the database, manipulate the data, and, prior to the completion of the application service, make a database service request to update that data in the database. When an Application Server completes a service, an update data service request is sent to the Database Server. This request includes all factory object data segment changes made by the Application Server that need to be made persistent in the relational database.

The database node runs its own Communication Manager in a set of Database Servers. Each Database Server can be active or idle. Active Database Servers are dedicated to an Application Engine until a commit service request from the Application Engine is processed. Once processed, the Database Server changes to an idle state. The Database Server changes from idle to active when it receives an open database service request from an Application Engine through its Communication Manager. As mentioned, the database node can be a work station computer, a mini computer, or a cluster of many computers. The Database Servers on the database node receive database service requests made by the Application Servers on the application node. These service requests are routed to a Database Server through the Communication Manager on the database node. Thus, the Database Servers physically update the database and commit the update at the request of the Application Engine.

It should be appreciated that each Database Server stores a plurality of database objects. Each database object is modelled after a relation or view in the underlying relational database. Each factory object's data segment corresponds to a database object. Each service request made to the Database Server is decomposed into invocations of database methods, depending on which factory objects were changed, created or deleted by an Application Server that made the database service request. Embedded in database object methods are statements that manipulate relations in the underlying relational database. All changes to the database are not committed until the corresponding Application Engine requests a commit.

Process Architecture (Object-Oriented)

Since the presently invented architecture is distributed in nature, each of the four aspects of software described previously are preferably modelled as separate processes. For instance, Application Engines are objects which correspond to the form aspect of software, Application Servers model the functional aspect, and Communication Managers and Database Servers are modelled as separate processes corresponding to the communication and data aspects of the software system, respectively.

Figure 8:
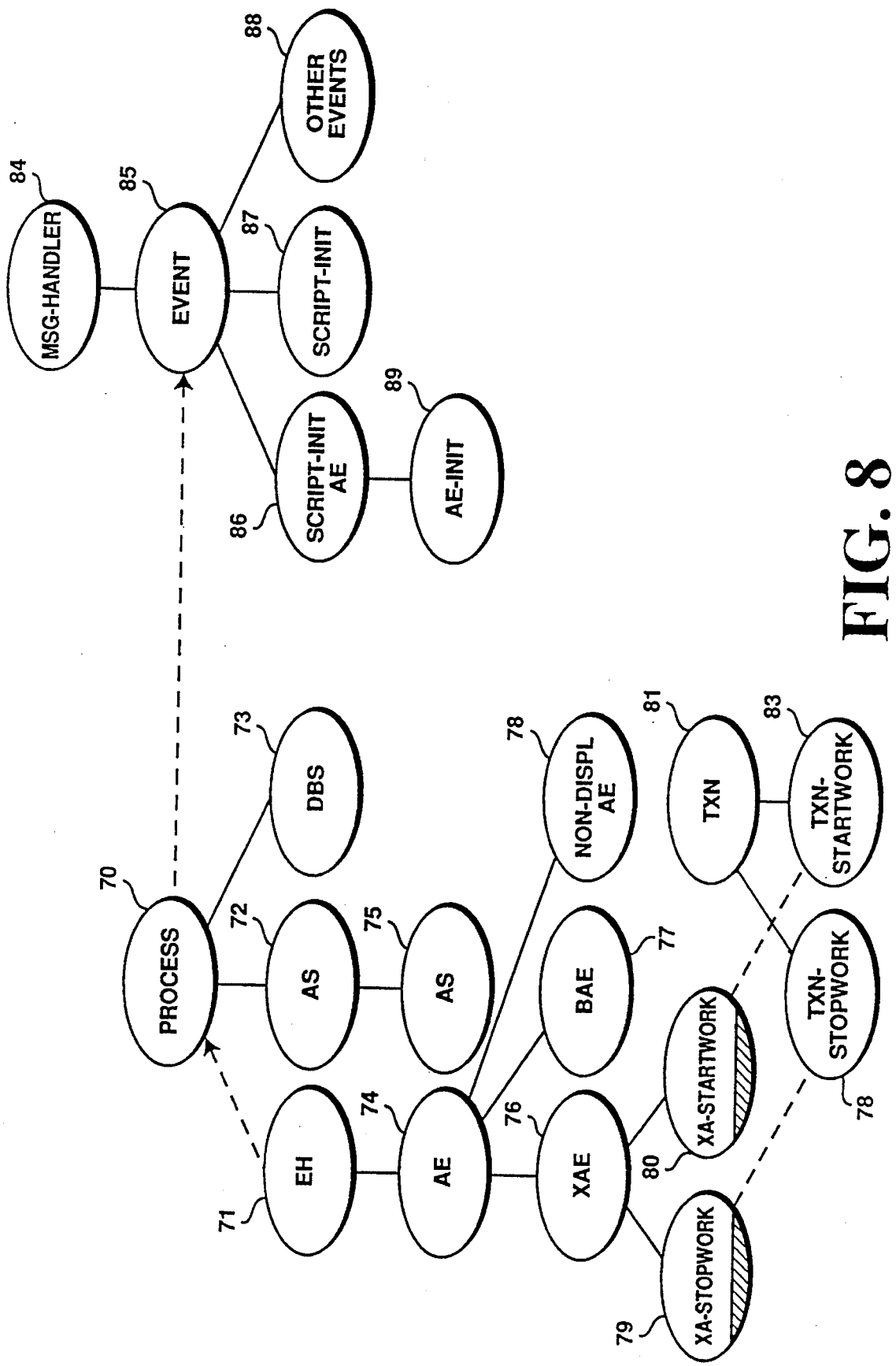
FIG. 8 is a diagram of the object-oriented process architecture of the currently preferred embodiment.

Certain characteristics of all of these four types of processes are then abstracted into a superset process called "PROCESS". This superset process is shown in FIG. 8 as object 70. From there, all of the other objects within the system (such as Application Engines, Application Servers, Database Servers, etc.) can be effectively subclassed because they all share the common attributes of "PROCESS".

By way of example, in FIG. 8 objects 71–74 (corresponding to Event Handler, Application Server, Database Server and Application Engine, respectively) are shown subclassed from object 70. (Note that Application Server 75 is shown subclassed from Application Server 72.) The characteristics and behavior which are encapsulated in object 70 include the ability to be able to create a process and execute it, along with the ability to send messages through event handler object 71, and the ability to receive replies. In this respect, process 70 has the capability of creating event 85, or any subclass of events 86–89, all of which are subclassed from object 84.

Appreciate that in the object-oriented process diagram of FIG. 8, a network message is modelled as an event object, which is handled by event handler 71. A user interface in a software system which is X-window based has the ability to react to events generated by the X-server. This means that there is a need for special event handling capability that is typical of Application Engines. For this reason, event handler object 71 is shown subclassed from object 70, while Application Engine 74 is shown subclassed from event handler object 71. From there, objects 76–78 are subclassed from object 74 corresponding to window-based Application Engines (XAE), bar-code Application Engines (BAE) and non-display types of interfaces. (A non-display interface might simply go and read a file and react to it.) X-applications 79 & 80 and transactions 81–83 are shown being further subclassed from object 76.

Levels Of Functionality

Figure 9:
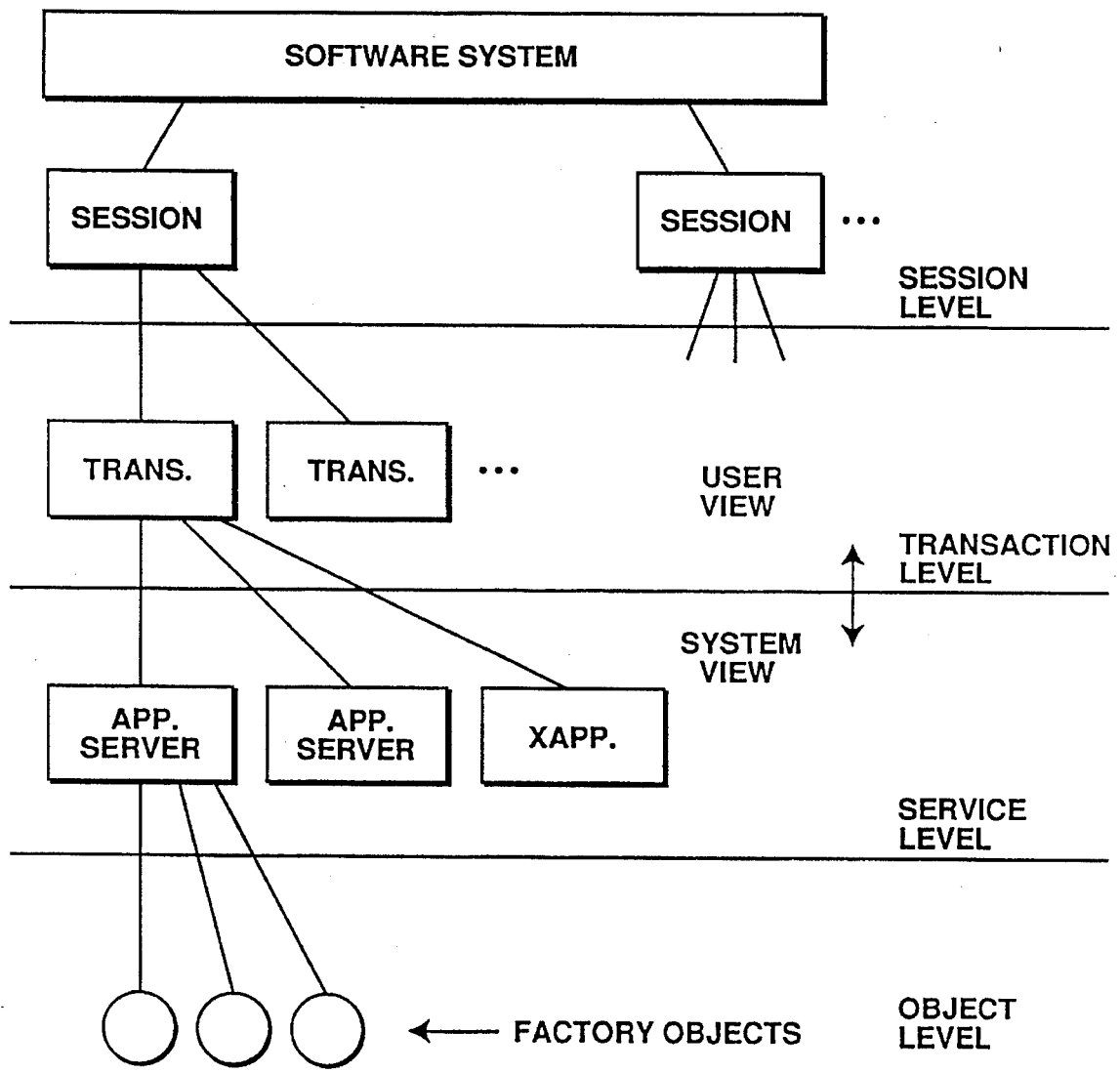
FIG. 9 illustrates the levels of functionality incorporated into the currently preferred embodiment of the present invention.

Recall that the software systems supported by the present architecture consists of four levels of functionality. The structure of these functional levels is shown in FIG. 9. The user or session level is initiated by user log-on and encompasses all other levels from the users perspective. On the other hand, the transaction level is concerned with the performance of a specific task. Transactions can be user defined (script) or built-in functions. Beyond the transaction level, the service function level is composed of single, well-defined, reusable building blocks which can be assembled into transactions. Usually, these building blocks comprise application services, or an application script server which allows the user to write transactions as script. Finally, the object level provides the finest level of granularity of functionality.

Objects are abstractions of the factory floor entities and are modelled by the data stored within the database. Within the software system, an object library typically exists which uses objects to model the factory. Data is found in the data structure of these objects (i.e., the instance variables). These objects also contain the associated executable code (i.e., methods) which can be called on to act on the structures (i.e., messaging). This data can only be manipulated by messages sent to the objects; that is, the database itself is never directly accessed. A partial list of factory objects included in the currently preferred embodiment is given in Table 1.

TABLE 1

| Object Classes | | |
|---|---|---|
| Equipment | Stationary | Machine |
| | | Queue (storage) |
| | | Sensor |
| | | Store |
| | Mobile | Production Tool |
| | | Carrier |
| | | Fixture |
| Personnel | Operator | |
| | Supervisor | |
| Work Instructions | Temporal | Route (Process Spec) |
| | | Equipment Reservation Schedule |
| | | Equipment Maintenance Schedule |
| | Compositional | Bill of Materials |
| | | Bill of Resources |
| Product | Lot | Repetitive |
| | | Workorder |
| | | Serial |
| | Intermediate | Kit |
| | | Batch |
| | Biproduct | Scrap |
| | | Waste |
| Material | Consumable | |
| | Consitiuent | Raw |
| | | External |
| | | Fabricated |
| Procedure | Workorder | |
| | Operation | |
| | Engineering | |
| | Parameters | |

Building an application is a process of sending appropriate messages. These objects are written to provide the most basic level of functionality in the system. Obviously, the primary advantage of objects is their reusability. Combinations of objects and messages to the objects, allow more general functionality to be constructed. This functionality is encapsulated according to the present invention at the object library and Application Server levels. Although the objects form the basis of the hard-coded application services functions, they can also be messaged directed by script.

Although the present invention has been described in conjunction with an application towards a factory floor management software system, it bears repeating that the present invention may be implemented in a great variety of applications and systems. Therefore, it is to be understood that the particular embodiments shown and described by way of illustration are in no way intended to be limiting. Reference to the details of the preferred embodiment are not intended to limit the scope of the claims.

Thus, an object-oriented architecture for use with a complex software system has been described.

What is claimed is:

1. An object-oriented distributed computer system for factory floor management, the distributed computer system comprising:

a plurality of processing nodes, each processing node of the plurality of processing nodes including a processor and a memory, each processing node of the plurality of processing nodes being communicatively coupled to other nodes of the plurality of processing nodes;

the plurality of processing nodes including a plurality of database nodes, each database node of the plurality of database nodes storing a portion of a single relational database, the relational database including a plurality of factory objects which represent factory floor entities of a factory floor management system, wherein each factory floor object of the plurality of factory floor objects belongs to an object class of a plurality of object classes, wherein the plurality of object classes are related according to a predetermined class hierarchy; and wherein each processing node of the plurality of processing nodes executes at least one of the following:
an interface server receiving input from a user and initiating a server request in response to the input;
an application engine receiving the server request and generating one or more application service requests responsive to the server request;
an application server processing an application service request of the one or more application service requests and generating one or more database service requests to access the factory objects in the relational database responsive to the application service request; and
a database server accessing the factory objects in the relational database in response to a data service request of the one or more database service requests wherein each of the interface server, application engine, application server and database server is executed on at least one processing node.

2. The distributed computer system of claim 1, wherein the plurality of processing nodes includes a plurality of application nodes.

3. The distributed computer system of claim 2, wherein each of the application nodes executes a communication manager spawning a plurality of application servers responsive to the application service request.

4. The distributed computer system of claim 3, wherein the plurality of application servers comprise a remote object server process for handling an application service request for operations on non-persistent objects.

5. The distributed computer system of claim 2, wherein each application node of the plurality of application nodes executes a single remote object server process for communicating with other nodes of the plurality of application nodes.

6. The distributed computer system of claim 1, wherein a first processing node executing the database server belongs to a first database domain of a plurality of database domains, wherein a given database service request of the database service requests received by the first processing node is a request for access to a factory object which resides on a second node executing the communication manager in a second domain of the plurality of database domains, the second domain being a different domain than the first database domain, the second node executing the communication manager also executing a second database server, wherein the first processing node executing the database server transmits a request signal to the second node executing the communication manager responsive to the given database request, wherein the first processing node executing the communication manager accesses the relational database responsive to the request signal.

* * * * *